Patented Nov. 13, 1934

1,980,959

UNITED STATES PATENT OFFICE 1,980,959

ARTIFICIAL MASS

Guido Schultze, Mannheim, Germany, assignor to I. G. Farbenindustrie Aktiengesellschaft, Frankfort-on-the-Main, Germany No Drawing. Application October 31, 1932, Serial No. 640,505. In Germany November 3, 1931

4 Claims. (Cl. 106—23)

The present invention relates to the production of artificial masses.

It is already known that inhomogeneous dispersions of rubber or rubber halides and vinyl or acrylic esters can be obtained by subjecting mixtures of the said materials to heavy beating, grinding or rolling in the presence of non-solvents for the said materials. If desired, a small quantity of a solvent for one of the said materials may be added in order to facilitate the said mechanical operations. The inhomogeneous dispersions obtained cannot be used for many purposes since the single particles of the solid materials are not combined with each other but are situated beneath each other especially if the dispersions are dried for example when applied in a thin layer on a solid substratum.

I have found that homogeneous artificial masses, having very valuable properties and fulfilling to a large extent all requirements as regards resistance to water and hardness, can be obtained by homogeneously mixing anhydrous chlorinated rubber materials with anhydrous, polymeric water-insoluble monovinyl compounds which are soluble in liquid hydrocarbons of the benzene series. The term "rubber materials" is meant to comprise natural rubber as well as related products, such as guttapercha, balata and the like or polymerization products of hydrocarbons of the butadiene series. The chlorinated rubber materials usually contain from 50 to 70 per cent of chlorine, preferably from about 58 to about 68 per cent thereof. They may be mixed with the said polymeric mono-vinyl compounds as such, for example by rolling or, preferably, the chlorinated rubber materials, either dissolved in suitable solvents or undissolved, may be added to anhydrous solutions of the polymeric vinyl compounds. Suitable polymeric mono-vinyl compounds are for example the polymerization products obtainable from vinyl esters, such as vinyl acetate, vinyl chloracetate and vinyl chloride, vinyl ethers, such as vinyl methyl, ethyl, hydroxy-ethyl, butyl, cetyl and cyclohexyl ethers, styrene or mixtures of the said vinyl compounds, provided the polymeric compounds are soluble in liquid hydrocarbons of the benzene series. The said solubility is also a measure for the ratio in which the said polymeric vinyl compounds should be combined with the chlorinated rubber material. If the solubility of the polymeric vinyl compounds in liquid hydrocarbons of the benzene series, such as benzene, toluene or xylene, and also in liquid chlorinated hydrocarbons, esters and ketones, is very high they may be combined with the chlorinated rubber materials in practically any proportion such as with up to only 5 percent of their weight of the chlorinated rubber materials. With decreasing solubility the quantity of the polymeric mono-vinyl compounds should be reduced but in any case at least 5 per cent by weight of the chlorinated rubber materials, preferably more than 10 per cent, is employed in order to obtain the valuable results imparted to the chlorinated rubber materials by the addition of the polymeric vinyl compounds. On the other hand the minimum quantity of the chlorinated rubber materials should be at least 5 per cent by weight of the polymeric vinyl compounds for similar reasons, the addition of the polymeric vinyl compounds imparting for example to films from the chlorinated rubber materials in higher adhesive power and fastness to light and the addition of the chlorinated rubber materials imparting for example to films from the polymeric vinyl compounds a higher resistance to water and to chemical influences. Apparently some kind of reaction takes place between the chlorinated rubber materials and the polymeric vinyl compounds which latter are apparently not completely polymerized when they are in the state of solubility required for their employment according to the present invention, that is in the absence of any substantial quantities of water. Similar products, which may be employed, are therefore polymerization products, the polymerization of which has been carried out already in the presence of the aforesaid chlorinated rubber materials.

Solvents for the chlorinated rubber materials as well as for the polymeric vinyl compounds, as for example polymeric vinyl acetate, are for example benzene, toluene, monochlorbenzene, dichlorbenzene, methylene chloride, ethylene chloride, chloroform, carbon tetrachloride, butyl acetate, amyl acetate, cyclohexyl acetate and the acetates of the mono-methyl or -ethyl ethers of ethylene glycol, cyclohexanone, methyl cyclohexanone and 1.4-dioxane; to these solvents or mixtures thereof also xylene or solvent naphtha, di- or tri-chlorethylene, methyl, ethyl or ethylene glycol mono-acetates and acetone may be added if desired and also alcohols, such as methyl, ethyl, isopropyl, butyl and amyl alcohols, benzyl alcohol, cyclohexanol or ethylene glycol which are no solvents either for the chlorinated rubber materials or for the polymeric vinyl compounds, similarly as benzine or ethers, such as ethyl ether and the mono-methyl, ethyl or butyl ethers of ethylene glycol. Linseed and China wood oil which are no solvents for the polymeric vinyl compounds may be also added. As usual in the lacquer and varnish industries the said additional solvents must not be used in quantities effecting a precipitation of the solid substances from their solutions in solvents therefor.

The additions usual in the preparation of lacquers, varnishes, films and other artificial masses, such as softening agents, natural and hard artificial resins and other film forming substances, such as cellulose derivatives, drying oils and non-drying or drying resins of the alkyd resin type, moreover dyestuffs and/or fillers may also be employed.

The quantity of the chlorinated rubber material to be employed depends in each case on the desired purpose of application of the final product and on the requirements in each specific case. In addition to the aforesaid explanations about the adhesive properties and fastness to light and chemical influences it may be stated that an addition of large quantities of for example polymeric vinyl acetate increases the gloss of the final products which are, however, comparatively soft whereas preponderating quantities of the chlorinated rubber materials increase the hardness of the final products. The solutions containing polymeric vinyl compounds and chlorinated rubber materials and, if desired, other components of the aforesaid nature, may be employed with advantage as varnishes, as primers for application by a spatula or by spraying, as cements or adhesives, as insulating agents, for example, for the electrotechnical industry, as impregnating and soaking substances, luting agents, as solutions for spinning artificial threads or pouring films, foils and the like. The mixtures of polymeric vinyl compounds with chlorinated rubber materials, prepared without or with only small amounts of solvents, may also be employed as moulding compositions. The latter masses can be injected into moulds in the manner known for injection-moulding acetyl cellulose. The homogeneous mixtures containing polymeric vinyl compounds and chlorinated rubber materials are also suitable as intermediate layers in the manufacture of safety glass.

The following examples will further illustrate the nature of this invention which, however, is not restricted thereto. The parts are by weight.

Example 1

10 parts of chlorinated india rubber containing about 65 per cent of chlorine and 10 parts of a polymeric vinyl acetate soluble in ethyl alcohol and benzene are dissolved in a mixture consisting of 60 parts of toluene, 15 parts of xylene, 2.5 parts of butyl acetate and 2.5 parts of 96 per cent ethyl alcohol. From 5 to 10 parts of zinc white and, if desired, from 1 to 3 parts of tricresylphosphate are added to the solution. A white varnish is obtained, which furnishes coatings of an excellent resistance to water and a great superficial hardness. The process may also be carried out by first dissolving the chlorinated rubber and the polyvinylacetate, each separately, in a portion of the aforesaid solvent mixture and by then combining the solutions.

Example 2

20 parts of chlorinated india rubber containing about 68 per cent of chlorine and 10 parts of a polymeric vinyl methyl ether are dissolved in a mixture of 30 parts of methylene chloride, 30 parts of toluene and 8 parts of cyclohexanone. From 5 to 10 parts of titanium dioxide and, if desired, from 2 to 5 parts of phthalic dibutyl ester are added. A white varnish giving highly elastic coatings is obtained.

Example 3

10 parts of polymeric vinyl chloride are dissolved in 150 parts of toluene whereupon the solution is mixed with a mixture of 5 parts of chlorinated india rubber containing about 60 per cent of chlorine with 20 parts of toluene, 10 parts of butyl acetate and 5 parts of tricresyl phosphate, the whole being then incorporated with 10 parts of zinc white. A varnish is obtained which gives coatings which are highly resistant to chemical agents, such as alkalies or acids.

Example 4

15 parts of chlorinated india rubber containing about 65 per cent of chlorine and 5 parts of polymeric styrene are dissolved in a mixture of 40 parts of toluene, 30 parts of xylene, 8 parts of monochlorbenzene and 2 parts of polychloro diphenyl. By grinding the whole with from 10 to 15 parts of iron oxide or slate meal and from 3 to 5 parts of tricresyl phosphate, a varnish is obtained which furnishes valuable rust-proof coatings on iron articles.

What I claim is:—

1. Artificial masses, suitable as bases for varnishes, comprising a homogeneous combination of a chlorinated rubber material and at least 5 per cent by weight thereof of a polymeric water-insoluble mono-vinyl compound soluble in liquid hydrocarbons of the benzene series.

2. Artificial masses, suitable as bases for varnishes, comprising a homogeneous combination of a chlorinated rubber material, at least 5 per cent by weight thereof of a polymeric water-insoluble mono-vinyl compound soluble in liquid hydrocarbons of the benzene series, and an organic solvent for the said rubber material and vinyl compound.

3. Artificial masses, suitable as bases for varnishes, comprising a homogeneous combination of chlorinated rubber, at least 5 per cent by weight thereof of a polymeric vinyl methyl ether soluble in liquid hydrocarbons of the benzene series and an organic solvent for said chlorinated rubber and said vinyl ether.

4. Artificial masses, suitable as bases for varnishes, comprising a homogeneous combination of chlorinated rubber, at least 5 per cent by weight thereof of a polymeric vinyl acetate soluble in liquid hydrocarbons of the benzene series and an organic solvent for said chlorinated rubber and said vinyl acetate.

GUIDO SCHULTZE.